United States Patent
Abdul Wahab et al.

(10) Patent No.: US 11,303,722 B2
(45) Date of Patent: Apr. 12, 2022

(54) MACHINE LEARNING METHOD FOR ADAPTIVE VIRTUAL NETWORK FUNCTIONS PLACEMENT AND READJUSTMENT

(71) Applicants: Omar Abdul Wahab, Gatineau (CA); Nadjia Kara, Kirkland (CA); Claes Göran Robert Edström, Beaconsfield (CA)

(72) Inventors: Omar Abdul Wahab, Gatineau (CA); Nadjia Kara, Kirkland (CA); Claes Göran Robert Edström, Beaconsfield (CA)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 17/263,003

(22) PCT Filed: Jul. 30, 2019

(86) PCT No.: PCT/IB2019/056490
§ 371 (c)(1),
(2) Date: Jan. 25, 2021

(87) PCT Pub. No.: WO2020/026140
PCT Pub. Date: Feb. 6, 2020

(65) Prior Publication Data
US 2021/0314418 A1    Oct. 7, 2021

Related U.S. Application Data

(60) Provisional application No. 62/711,816, filed on Jul. 30, 2018.

(51) Int. Cl.
*H04L 29/08* (2006.01)
*H04L 67/2895* (2022.01)
(Continued)

(52) U.S. Cl.
CPC ...... *H04L 67/2895* (2013.01); *H04L 12/4641* (2013.01); *H04L 67/16* (2013.01); *H04L 67/34* (2013.01)

(58) Field of Classification Search
CPC ..... H04L 67/2895; H04L 67/16; H04L 67/34; H04L 12/4641
See application file for complete search history.

(56) References Cited

U.S. PATENT DOCUMENTS 9,716,626 B1   7/2017  Herzog
9,781,055 B2   10/2017 Liu
(Continued)

FOREIGN PATENT DOCUMENTS

WO    2019012485 A1   1/2019

OTHER PUBLICATIONS

B. Li et al., Deep-Learning-Assisted Network Orchestration for On-Demand and Cost-Effective vNF Service Chaining in Inter-DC Elastic Optical Networks, School of Information Science and Technology, University of Science and Technology of China, Hefei, Anhui, Manuscript received on Feb. 1, 2018.

(Continued)

*Primary Examiner* — Blake J Rubin
(74) *Attorney, Agent, or Firm* — Julie Dufort; Ericsson Canada Inc.

(57) ABSTRACT

Virtual Network Functions (VNFs) are placed in a substrate network and the placement is readjusted based on dynamic resource availability and dynamic resource utilization in the substrate network. A predetermined number of servers is selected sequentially as cluster-heads based on a set of metrics which measure the efficiency of the servers in different aspects. The servers are partitioned into the predetermined number of disjoint clusters with different efficiency aspects. Each cluster includes one of the cluster-heads which (Continued)

performs the placement and readjustment of the VNFs for the cluster. An incoming VNF is placed at a given server in a given cluster by the cluster-head of the given cluster, which optimizes an objective function subject to a set of constraints. The objective function is optimized with respect to a subset of the metrics which excludes one or more metrics in which the given cluster is efficient.

23 Claims, 11 Drawing Sheets

(51) Int. Cl.
  *H04L 12/46* (2006.01)
  *H04L 67/51* (2022.01)
  *H04L 67/00* (2022.01)

(56) References Cited

U.S. PATENT DOCUMENTS

| | | | |
|---|---|---|---|
| 9,794,352 B2 | 10/2017 | Qiang | |
| 9,806,979 B1* | 10/2017 | Felstaine | H04L 41/0893 |
| 9,838,361 B2 | 12/2017 | Birger | |
| 9,866,436 B2 | 1/2018 | Savla | |
| 9,888,397 B1 | 2/2018 | Puranik | |
| 9,954,758 B2 | 4/2018 | N | |
| 9,961,675 B1 | 5/2018 | Reed | |
| 10,447,547 B2* | 10/2019 | Vrzic | H04L 41/12 |
| 10,785,109 B1* | 9/2020 | Sidebottom | H04L 67/16 |
| 10,999,219 B1* | 5/2021 | Athreyapurapu | H04L 41/5051 |
| 2014/0325036 A1* | 10/2014 | Jahanbanifar | G06F 9/5077 709/220 |
| 2017/0017512 A1* | 1/2017 | Csatari | G06F 9/45558 |
| 2017/0279672 A1* | 9/2017 | Krishnan | G06F 9/45558 |
| 2017/0315839 A1 | 11/2017 | Zhang | |
| 2017/0318097 A1* | 11/2017 | Drew | H04L 41/0806 |
| 2017/0366428 A1 | 12/2017 | Shaw | |
| 2018/0011730 A1 | 1/2018 | Zembutsu | |
| 2018/0020015 A1 | 1/2018 | Munro | |
| 2018/0101397 A1 | 4/2018 | Sergeev | |
| 2018/0262431 A1* | 9/2018 | Zhang | H04L 47/125 |
| 2018/0302277 A1* | 10/2018 | Shimamura | H04L 41/0806 |
| 2018/0317134 A1* | 11/2018 | Leroux | H04W 24/02 |
| 2018/0329735 A1* | 11/2018 | Liu | G06F 9/45558 |
| 2019/0104182 A1* | 4/2019 | Elzur | H04L 41/5025 |
| 2019/0166002 A1* | 5/2019 | Chen | H04L 41/0896 |
| 2020/0007236 A1* | 1/2020 | Choudhury | H04L 41/082 |

OTHER PUBLICATIONS

C. Pham et al., Traffic-aware and Energy-efficient vNF Placement for Service Chaining: Joint Sampling and Matching Approach, IEEE Transactions on Services Computing, 1939-1374 (c) 2016 IEEE.
D. Yu et al., An improved K-medoids algorithm based on step increasing and optimizing medoids, Expert Systems With Applications 92 (2018) 464-473.
J. G. Herrera et al., Resource Allocation in NFV: A Comprehensive Survey, IEEE Transactions on Network and Service Management, vol. 13, No. 3, Sep. 2016.
J. Liu et al., On Dynamic Service Function Chain Deployment and Readjustment, IEEE Transactions on Network and Service Management, vol. 14, No. 3, Sep. 2017.
M. C. Luizelli et al., A fix-and-optimize approach for efficient and large scale virtual network function placement and chaining, Elsevier, Computer Communications 102 (2017) 67-77.
M. Ghaznavi et al., Elastic Virtual Network Function Placement, 2015 IEEE 4th International Conference on Cloud Networking (CloudNet).
M. Xia et al., Network Function Placement for NFV Chaining in Packet/Optical Datacenters, Journal of Lightwave Technology, vol. 33, No. 8, Apr. 15, 2015.
O. A. Wahab et al., MAPLE: A Machine Learning Approach for Efficient Placement and Adjustment of Virtual Network Functions, Elsevier, Journal of Network and Computer Application. 142 (2019) 37-50.
R. Cohen et al., Near Optimal Placement of Virtual Network Functions, 2015 IEEE Conference on Computer Communications (INFOCOM).
S, Mehraghdam et al., Specifying and Placing Chains of Virtual Network Functions, arXiv:1406.1058v1, Jun. 4, 2014.
S. Ayoubi et al., A Reliable Embedding Framework for Elastic Virtualized Services in the Cloud, IEEE Transactions on Network and Service Management, vol. 13, No. 3, Sep. 2016.
S. Khebbache et al., A Multi-objective Non-dominated Sorting Genetic Algorithm for VNF Chains Placement, 2018 15th IEEE Annual Consumer Communications & Networking Conference (CCNC).
S. S. Krishnan et al., Video Stream Quality Impacts Viewer Behavior: Inferring Causality Using Quasi-Experimental Designs, IEEE/ACM Transactions on Networking, vol. 21, No. 6, Dec. 2013.
V. Eramo et al., An Approach for Service Function Chain Routing and Virtual Function Network Instance Migration in Network Function Virtualization Architectures, IEEE/ACM Transactions on Networking, vol. 25, No. 4, Aug. 2017.
X. Sun et al., PRIMAL: PRofit Maximization Avatar placement tor Mobile Edge Computing, IEEE ICC 2016—Next-Generation Networking and Internet Symposium.
SR and Written Opinion from corresponding application PCT/IB2019/056490.

* cited by examiner

| Symbol | Significance |
| --- | --- |
| $V_h$ | Set of host servers in the substrate network. |
| $V_v$ | Set of virtual network functions in a certain SFC. |
| $E$ | Set of physical links in the substrate network. |
| $E_v$ | Set of virtual links in a certain SFC. |
| $P$ | Set of VNF types supported in the network. |
| $\eta_p$ | Maximum number of users that VNF of type $p \in P$ can support. |
| $R_{v_h}^{max}$ | Amount of hardware resource capacity on physical server $v_h \in V_h$. |
| $R_m^p$ | Amount of hardware resources consumed by VNF of type $p \in P$ on server $m$. |
| $y_{v_h,p}$ | An integer variable which signalizes the number of VNFs of type $p \in P$ that are hosted on server $v_h \in V_h$. |
| $bw_e$ | Residual bandwidth on physical link $e$ in the substrate network. |
| $\hat{bw}_{e_v}$ | Bandwidth demand for link $e_v \in E_v$ in the SFC. |
| $\alpha_{n,m}^p$ | Decision variable whose value is equal to 1 if VNF $n$ of type $p$ is hosted in server $m$ and 0 otherwise. |
| $\beta_{i,j}$ | Decision variable whose value is 1 if the virtual link $i$ is mapped into physical link $j$ and 0 otherwise. |
| $\Gamma_n^{m,\bar{m}}$ | Monetary weight of migrating VNF $n$ from server $m$ to another server $\bar{m}$. |
| $\phi_m$ | Monetary weight of the energy consumption of server $m$. |
| $\upsilon_e$ | Monetary weight of the bandwidth consumption on link $e$. |
| $p_m^{idle}$ | Power consumption of server $m$ in the idle state. |
| $p_m^{max}$ | Maximum power consumption of server $m$. |
| $\tau_{n,m}$ | Average CPU consumed by VNF $n$ hosted on server $m$. |
| $\xi_{n,m}$ | Monetary weight of adding a new VNF $n$ of physical server $m$. |
| $\Upsilon_{x,y}^{a,b}$ | Monetary weight of the service delay penalty between each pair of hosted VNFs $a$ and $b$ hosted on physical servers $x$ and $y$ respectively. |
| $d_{x,y}^{a,b}(t)$ | Delay between the pair $(a, b)$ of VNFs hosted on physical servers $x$ and $y$ respectively. |
| $N_m^{|V_v|}$ | Number of VNFs $|V_v|$ hosted on physical server $m$. |
| $E_n$ | Residual energy on server $n$. |
| $\ell_{x,y}^{a,b}$ | Maximum delay that a flow of pair $a$ and $b$ of VNFs hosted on top of physical servers $x$ and $y$ respectively can tolerate. |
| $q_{v_v,e}$ | Boolean variable whose value is 1 if the connection from VNF $v_v$ to VNF $(v_v + 1)$ uses the path $e$ and 0 otherwise. |
| $s(e)$ | Source node of path $e$. |
| $d(e)$ | Destination node of path $e$. |
| $\mu_{v_h}$ | Threshold for scaling resources on physical server $v_h$ whose value is in the interval $[0, 1]$. |
| $\Pi$ | Set of metrics to be minimized. |
| $h^\Theta$ | Cluster-head $h$ that is efficient in terms of metrics $\Theta$ (where $\Theta \subseteq \Pi$ is a single combination subset of the set $\Pi$). |
| $\Phi_{V_v^k}(s)$ | Set of VNFs $V_v^k$ hosted on physical server $s$. |
| $\psi_{E_v}(e)$ | Set of virtual links $E_v$ hosted on substrate link $e$. |

TABLE 1

FIG. 3

Algorithm 1: Substrate Network Clustering

1: Input: Set of physical servers
2: Input: Number $\kappa$ of clusters
3: Input: Set $\Pi = \{energy, bandwidth, CPU, delay\}$ of metrics to be minimized.
4: Output: Set $C = \{C_1, \ldots, C_\kappa\}$ of clusters
5: Output: Set $H^\Theta = \{h_1^\Theta, \ldots, h_\kappa^\Theta\}$ of cluster-heads such that each cluster-head $h_i^\Theta \in H^\Theta$ is efficient in terms of metrics $\Theta \subseteq \Pi$.
6: procedure CLUSTERING
7:   Compute the distance between each pair of servers using Eq. (16)
8:   Compute the variance of the whole set of servers using Eq. (17)
9:   Compute each server's variance with regards to all other servers using Eq. (19)
10:  Define the set of candidate cluster-heads using Eq. (20)
11:  Choose two initial cluster-heads $H = \{h_1, h_2\}$ using Eqs. (22) and (23)
12:  Assign each server to the closest cluster-head and compute the total clustering cost using Eq. (25).
13:  Increase the number of clusters up to $\kappa$ using Eq. (24).
14:  Repeat
15:    Assign each server to the closest cluster-head
16:    Compute the sum $D_1$ of distances from all cluster members to their cluster-head using Eq. (25).
17:    Select a new cluster-head of each cluster as the one that minimizes the total distance from the other servers in its cluster.
18:    Update the current cluster-head in each cluster by substituting it with the newly chosen cluster-head.
19:    Assign each server to the closest cluster-head.
20:    Compute the sum $D_2$ of distances from all cluster members to their cluster-head using Eq. (25).
21:    If $D_2 = D_1$, stop the algorithm; otherwise go back to step 16.
22:  end
23: end procedure

FIG. 4

Algorithm 2: Placement Algorithm

1: Input: Set $\Pi = \{energy, bandwidth, CPU, delay\}$ of metrics to be minimized.
2: Input: Cluster-head $h^\Theta$ that is efficient in terms of metrics $\Theta$ (where $\Theta \subseteq \Pi$ is a single combination subset of the set $\Pi$) and responsible for executing the Algorithm.
3: Input: Service function chain composed of a set $V_v^k = \{v_v^1, \ldots, v_v^n\}$ of VNFs
4: Input: Set $\Phi_{V_v^k}(s_i)$ of VNFs $V_v^k$ hosted on each server $s_i$.
5: Input: Set $\psi_{E_v}(e)$ of virtual links $E_v$ hosted on substrate link $e$.
6: Output: Updated set $\Phi'_{V_v^k}(s_i)$ of VNFs $V_v^k$ hosted on each server $s_i$.
7: Output: Updated set $\psi'_{E_v}(e)$ of virtual links $E_v$ mapped to link $e$.
8: procedure PLACEMENT
9:    $(\alpha, \beta) \leftarrow$ solve the ILP in Eq. (7) for the metrics $\Pi \setminus \Pi \cap \Theta = \emptyset$
10:    for each server $s_i \in V_h$
11:      for each VNF $v_v \in V_v$
12:        if $\alpha_{v_v,s_i}^p == 1$ then
13:          Assign $v_v^i$ to server $s_i$, i.e., $\Phi_{V_v^k}(s_i) = \Phi_{V_v^k}(s_i) \cup v_v^i s$
14:        end if
15:      end for
16:    end for
17:    for each link $e \in E$
18:      for each virtual link $e_v \in E_v$
19:        if $\beta_{e_v,e} == 1$ then
20:          Assign $e_v$ to link $e$, i.e., $\psi_{V_v^k}(s_i) = \psi_{V_v^k}(s_i) \cup v_v^i s$
21:        end if
22:      end for
23:    end for
24:    $\Phi'_{V_v^k}(s_i) = \Phi_{V_v^k}(s_i)$
25:    $\psi'_{E_v}(e) = \psi_{E_v}(e)$
26: end procedure

FIG. 5

Algorithm 3: Readjustment Algorithm

1: Input: Set $\Pi = \{energy, bandwidth, CPU, delay\}$ of metrics to be minimized.
2: Input: Service function chain composed of a set $V_v^k = \{v_v^1, \ldots, v_v^n\}$ of VNFs
3: Input: Set $\Phi_{V_v^k}(s_i)$ of VNFs $V_v^k$ hosted on each server $s_i$.
4: Input: Set $\psi_{E_v}(e)$ of virtual links $E_v$ hosted on substrate link $e$.
5: Output: Updated set $\Phi'_{V_v^k}(s_i)$ of VNFs $V_v^k$ hosted on each server $s_i$.
6: Output: Updated set $\psi'_{E_v}(e)$ of virtual links $E_v$ mapped to link $e$.
7: procedure READJUSTMENT
8:     Repeat
9:         Repeat
10:            if constraints (8)-(15) are satisfied
11:                 Maintain the status quo of the substrate network
12:            else
13:                 $H^\Theta \leftarrow$ DetermineHead()
14:                 for each cluster-head $h^\Theta \in H^\Theta$
15:                     $(\alpha, \beta) \leftarrow$ solve the ILP in Eq. (7) for the
16:                     metrics $\Pi \setminus \Pi \cap \Theta = \emptyset$
17:                     for each server $s_i \in V_h$
18:                         for each VNF $v_v \in V_v$
19:                           if $\alpha^p_{v_v,s_j} == 1$ then
20:                             $\Phi_{V_v^k}(s_i) = \Phi_{V_v^k}(s_i) \cup v_v^i s$
21:
22:                         end if
23:                     end for
24:                 end for
25:                 for each link $e \in E$
26:                     for each virtual link $e_v \in E_v$
27:                         if $\beta_{e_v,e} == 1$ then
28:                             $\psi_{V_v^k}(s_i) = \psi_{V_v^k}(s_i) \cup v_v^i s$
29:                       end if
30:                     end for
31:                 end for
32:             end for
33:            $\Phi'_{V_v^k}(s_i) = \Phi_{V_v^k}(s_i)$
34:            $\psi'_{E_v}(e) = \psi_{E_v}(e)$
35:        While constraint (11) is satisfied
36:     Until $\varepsilon$ elapses
37: end procedure

FIG. 6

Algorithm 4: Cluster-Head Determination

1: Input: Set $\Pi = \{energy, bandwidth, CPU, delay\}$ of metrics to be minimized.
2: Output: Set $H^\Theta$ of migration destination cluster-heads, where each $h^\Theta \in H^\Theta$ is efficient in terms of metrics $\Theta \subseteq \Pi$.
3: procedure DETERMINEHEAD
4:     if Constraint (9) and Constraint (10) are violated
5:         $\Theta = \{energy, CPU\}$
6:     if Constraint (9) and Constraint (12) are violated
7:     end if
8:         $\Theta = \{CPU, delay\}$
9:     if Constraint (9) and Constraint (13) are violated
10:     end if
11:         $\Theta = \{CPU, bandwidth\}$
12:     if Constraint (10) and Constraint (13) are violated
13:         $\Theta = \{energy, bandwidth\}$
14:     end if
15:     if Constraint (12) and Constraint (13) are violated
16:         $\Theta = \{bandwidth, delay\}$
17:     end if
18:     if Constraint (10) and Constraint (12) are violated
19:         $\Theta = \{energy, delay\}$
20:     end if
21: end procedure

FIG. 7

MACHINE LEARNING METHOD FOR ADAPTIVE VIRTUAL NETWORK FUNCTIONS PLACEMENT AND READJUSTMENT

CROSS-REFERENCE TO RELATED APPLICATIONS

This application claims the benefit of U.S. Provisional Application No. 62/711,816 filed on Jul. 30, 2018.

TECHNICAL FIELD

Embodiments of the invention relate to an adaptive cluster-based technique, which partitions a substrate network into a set of on-demand clusters to reduce the complexity of deploying new Virtual Network Functions (VNFs) or migrating VNFs.

BACKGROUND

As one of the many advantages of cloud computing, Network Function Virtualization (NFV) has revolutionized the network and telecommunication industry through enabling the migration of network functions from expensive dedicated hardware to software-defined components that run in the form of Virtual Network Functions (VNFs). NFV helps service providers overcome the shortcomings of traditional hardware appliances (a.k.a middle-boxes), which demand specialized managing personnel, entail high energy consumption, are short-lived and expensive, and complicate the process of adding new functionalities. To alleviate these burdens, NFV operates by converting traditional middle-boxes into single modules of software that are programmed to embody a certain VNF, thus fostering the isolation and easing the management of each single function. Another advantage of NFV lies in its ability to simplify the installation and deployment of VNFs on general-purpose servers, which facilitates the migration of VNFs across servers within the substrate network.

However, with NFV comes numerous challenges related mainly to the complexity of deploying and adjusting VNFs in the physical networks, owing to the huge number of nodes and links in today's datacenters, and the inter-dependency among VNFs forming a certain network service. Several contributions have been made in an attempt to answer these challenges, where most of the existing solutions focus on the static placement of VNFs and overlook the dynamic aspect of the problem, which arises mainly due to the ever-changing resource availability in the cloud datacenters and the continuous mobility of the users. Thus, there is a need to improve the organization and deployment of the VNFs to efficiently provide network services in a substrate network.

SUMMARY

In one embodiment, there is provided a method for placement and readjustment of VNFs in a substrate network including a plurality of servers. The method comprises selecting, sequentially, a predetermined number of servers as cluster-heads based on a set of metrics, each of which measures efficiency of the servers in one aspect; and partitioning the servers into the predetermined number of disjoint clusters with different efficiency aspects. Each cluster includes one of the cluster-heads which performs the placement and readjustment of the VNFs for the cluster. The method further comprises placing an incoming VNF at a given server in a given cluster to thereby provide a virtual network service. The given server is identified by the cluster-head of the given cluster by optimizing an objective function subject to a set of constraints, and the objective function is optimized with respect to a subset of the metrics which excludes one or more metrics in which the given cluster is efficient. The method further comprises adjusting the placement of the VNFs by migrating one or more of the VNFs between the clusters based on dynamic resource availability and dynamic resource utilization in the substrate network.

In another embodiment, there is provided a network node comprising processing circuitry and memory. The memory stores instructions executable by the processing circuitry to place and readjust placement of VNFs in a substrate network including a plurality of servers. The network node is operative to perform, or cause to perform, the aforementioned method.

Other aspects and features will become apparent to those ordinarily skilled in the art upon review of the following description of specific embodiments in conjunction with the accompanying figures.

BRIEF DESCRIPTION OF THE DRAWINGS

Embodiments will now be described, by way of example only, with reference to the attached figures.

FIG. 3 is a table of notations that are used throughout the disclosure.

FIG. 4 illustrates a clustering algorithm according to one embodiment.

FIG. 5 illustrates a placement algorithm according to one embodiment.

FIG. 6 illustrates a readjustment algorithm according to one embodiment.

FIG. 7 illustrates an algorithm for locating a migration destination cluster for a VNF according to one embodiment.

DETAILED DESCRIPTION

Figure 1:
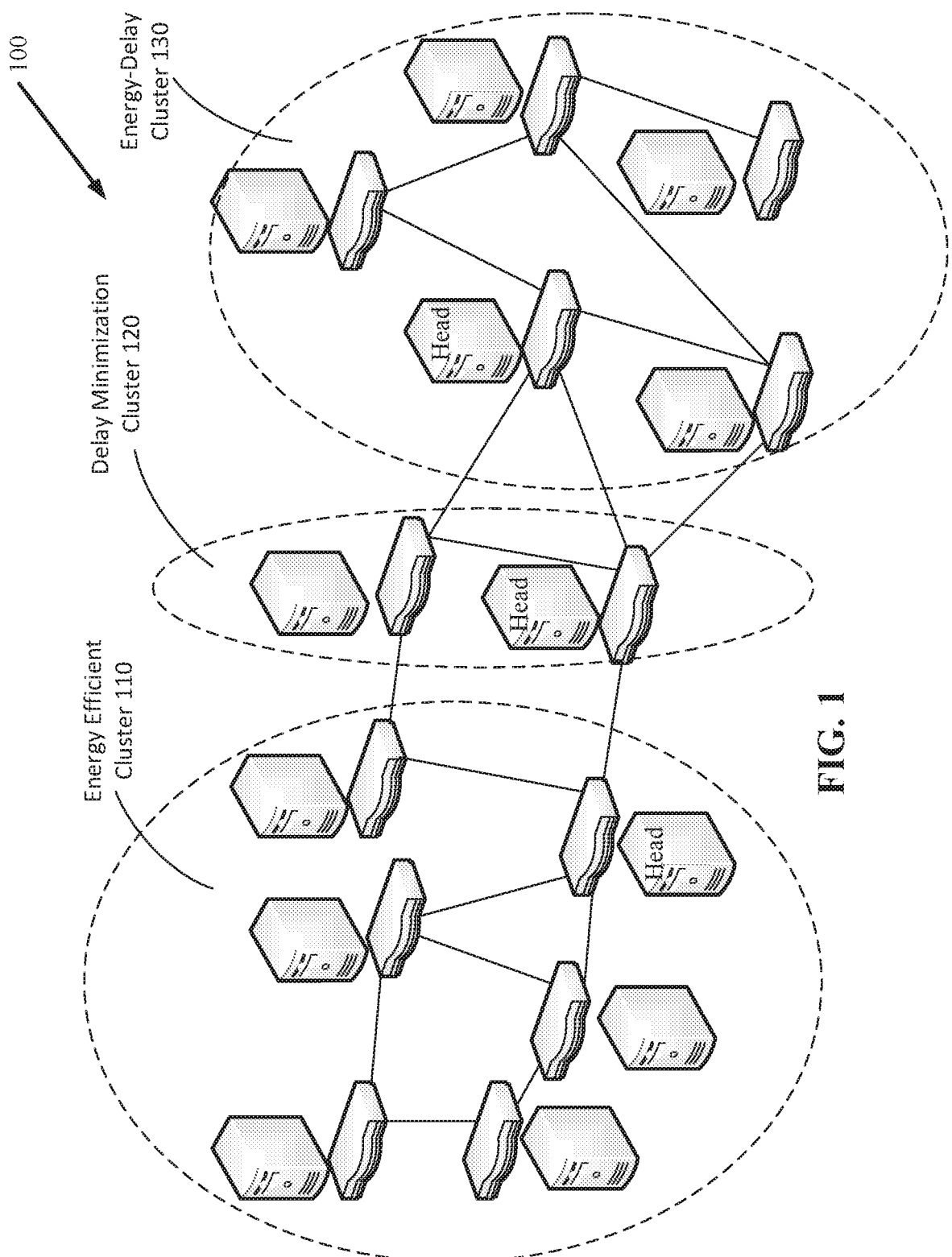
FIG. 1 illustrates the cluster-based architecture of a substrate network 100 according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide methods and systems based on machine learning to reduce the complexity of the placement and readjustment processes through a cluster-based solution. The solution, which is also referred to as the cluster-based method or the disclosed method, consists of (1) an Integer Linear Programming (ILP) model that takes into account the tradeoff between the minimization of the latency, Service-Level Objective (SLO) violation cost, hardware utilization, and VNF readjustment cost, (2) an optimized k-medoids clustering approach which proactively partitions the substrate network into a set of disjoint on-demand clusters, and (3) data-driven cluster-based placement and readjustment algorithms which capitalize on machine learning to intelligently eliminate some cost functions from the optimization problem to boost its feasibility in large-scale networks. Simulation results show that the solution significantly reduces the readjustment time and decreases the hardware consumption compared to known methods without the clustering approaches.

The resource consumption and availability of the servers in datacenters are often subject to continuous changes depending on the adopted placement strategy, the number of users being served, and the location of these users. Furthermore, more and more users are having a tendency to access services via their mobile devices. The disclosed method addresses the dynamic aspect of the VNF placement to ensure optimal Quality of Service (QoS) and resource utilization when users are moving or when the status of the cloud datacenters changes. More specifically, the disclosed method anticipates the need for promptly placing VNFs and readjusting the network by constantly clustering the substrate network (independently from the arrival of new VNF requests or the happening of any violation) to capture the resource availability changes at the level of the servers and prevent the violation of the constraints. The disclosed method also continuously readjusts the VNFs to guarantee service continuity.

The disclosed method is based on a semi-supervised machine learning approach. The disclosed method partitions the substrate network into a set of on-demand clusters managed by a set of cluster-heads. In one embodiment, a k-medoids clustering technique which is known for its robustness to noise and outliers may be used. However, since k-medoids suffers from several limitations in terms of its sensitivity to local optima and its time-consuming running time, the disclosed method incorporates a statistical technique which optimizes the selection of the initial set of medoids to enhance the clustering performance and clusters quality. Thereafter, machine learning-based VNF placement and readjustment algorithms are executed to efficiently deploy and migrate VNFs across physical servers. Note that most of the known machine learning approaches employ supervised learning to predict the resource needs of VNFs. Different from these known approaches, the semi-supervised machine learning approach disclosed herein partitions the substrate network into a set of disjoint clusters and intelligently reduces the number of cost functions that need to be optimized, which significantly leads to reducing the VNF placement and readjustment overhead.

A number of distinct features of the disclosed method are described herein. The disclosed method uses a machine learning approach to slice the substrate network into a set of disjoint clusters. The approach works in a proactive fashion to reduce both the setup latency and complexity of the VNF placement and readjustment processes. The disclosed method exploits semi-supervised machine learning to reduce the complexity of the VNF placement and readjustment processes. Semi-supervised learning is particularly beneficial in NFV environments where fully labeled data is often hard to obtain.

The VNF placement and readjustment problem is modeled as an ILP problem which considers a tradeoff among the minimization of the latency, SLO violation cost, hardware resource utilization, and VNF readjustment cost. The ILP is designed to be time-aware in order to provide network administrators with different placement and readjustment decisions at different time moments. This is useful in dynamic situations wherein the availability and resource utilization of servers and locations of users are subject to continuous change.

The disclosed method optimizes, among others, the delay between each pair of VNFs and the SLO penalty violation cost to help network providers maximize the performance of their services at a reduced cost. Moreover, different from the existing approaches, the disclosed method is time-aware in the sense that it works in a repeated fashion to provide network administrators with different placement and readjustment decisions at different time moments. This is critical in dynamic situations wherein the resource consumption status of the datacenters and the locations of the users are continuously changing. Besides, instead of using heuristic techniques to solve the problem, the disclosed clustering technique simplifies the optimal management and readjustment of VNFs by decentralizing these duties to local clusters. Finally, by using a cluster-based technique, the disclosed method scales well in dense datacenters consisting of a large number of nodes and links as well as in situations where there is a large number of VNFs to be placed.

The disclosed method adaptively and efficiently optimizes the hardware utilization (e.g., CPU) as well as energy, and network resource consumption (e.g., bandwidth) in the cloud datacenters while maximizing users' experience. A number of main advantages of the disclosed method include, but are not limited to the following aspects: (1) the disclosed method provides an original data-driven methodology to reduce the complexity of NP-hard optimization problems using machine learning; (2) the disclosed method scales well in large datacenters composed of a large number of servers and links; (3) the disclosed method is generic enough to be used to optimize any metric or combination of metrics in question (e.g., energy, bandwidth, CPU, latency, etc.); (4) the disclosed method works in a dynamic fashion to enable network administrators to make appropriate decisions in terms of migration and readjustment at each time moment in the light of the changes that occur at the level of the datacenter and at the level of users' locations; and (5) the disclosed method achieves a tradeoff between the minimization of the operational, transmission, and penalty violation costs and the VNF readjustment cost. The improved k-medoids clustering technique disclosed herein can be easily adapted to be applied to different types of problems where the input size is large.

FIG. 1 illustrates the cluster-based architecture of a substrate network 100 according to one embodiment. The cluster-based VNF placement and readjustment method may be applied to the substrate network 100 to cluster the servers into multiple disjoint clusters according to one or a combination of metrics (e.g., an energy efficient cluster, an energy-bandwidth efficient cluster, etc.). In this example, the substrate network 100 is partitioned into three clusters, including an energy efficient cluster 110, a delay minimization cluster 120 and an energy-delay cluster 130. Each cluster has a server designated as a cluster-head. In one embodiment, the partition and the cluster-head selection are performed according to the cluster-based VNF placement and readjustment method to be described herein.

Figure 2:
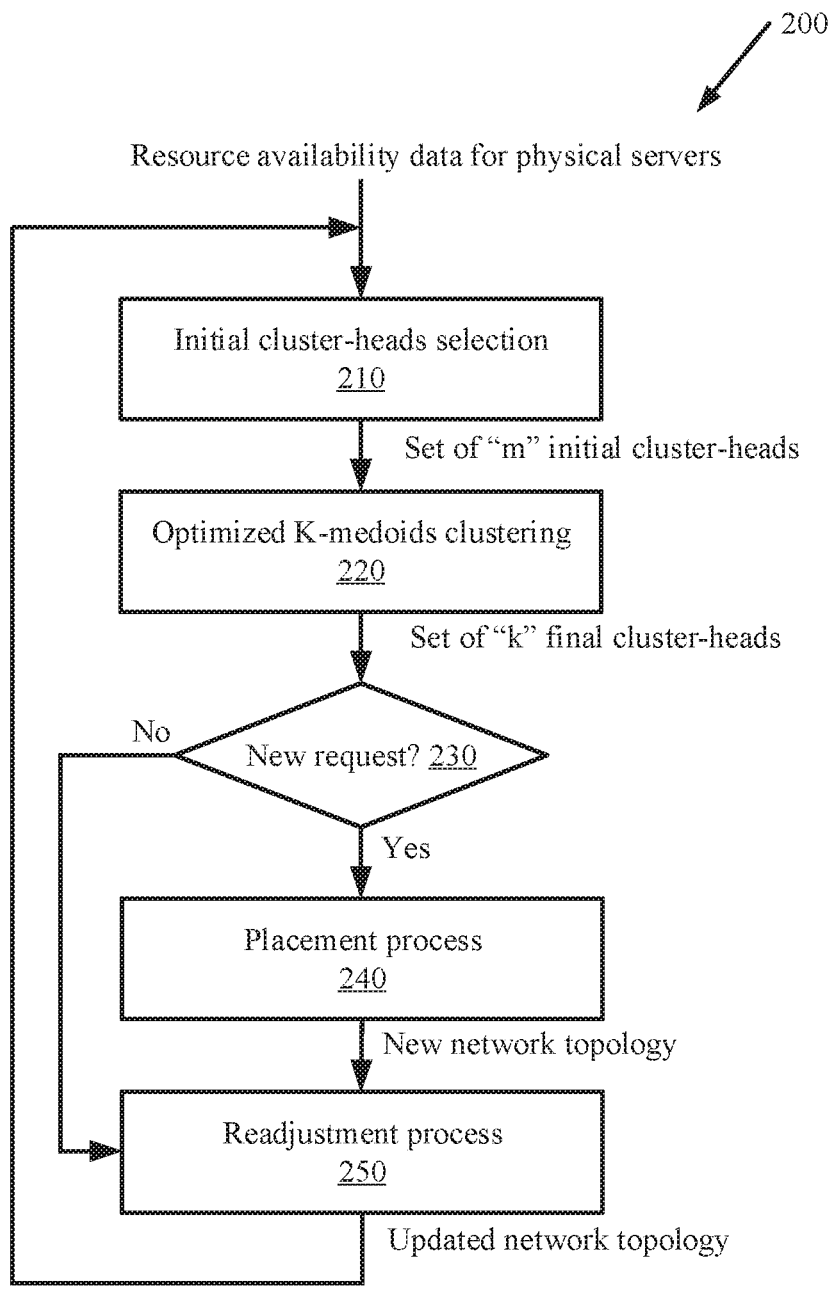
FIG. 2 illustrates an overview of a cluster-based VNF placement and readjustment method according to one embodiment.

FIG. 2 illustrates an overview of a cluster-based VNF placement and readjustment method 200 according to one embodiment. The method 200 receives an input including resource availability data for physical servers in the substrate network. At step 210, a set of m initial cluster-heads is identified. Having obtained the set of servers that are eligible to act as cluster-heads, at step 220 the set is optimized to include k final cluster-heads. In one embodiment, the number k may be specified by the network administrator. At this point, if there is a new request to place a VNF at step 230, a placement process is performed at step 240 to generate a new network topology, and at step 250 a readjustment process is performed to readjust the placement of the VNFs in the substrate network and to thereby generate an updated network topology. If, at step 230, there is no new request incoming, the method returns to step 210 to re-start the process of clustering the servers.

In one embodiment, the VNF placement and readjustment problem is formulated as a time-aware ILP optimization model whose objective functions and constraints are used as inputs to the cluster-based disclosed method. In the following, a detailed description of the optimization model is presented. The notations that are used throughout the disclosure are explained in Table 1 of FIG. 3.

Let $G_s(V_h, E)$ be an undirected graph representing the substrate network, where $V_h$ is the set of substrate nodes and E is the set of links connecting the nodes. Two types of substrate nodes can be distinguished, namely those of host servers and middleboxes. Host servers are high-volume servers that are supposed to host one more Virtual Machines (VMs) or containers pertaining to one or more users. On the other hand, middleboxes are physical network infrastructure that provide various network functions ranging from Wide Area Network (WAN) optimizers and multimedia caches to Intrusion Detection Systems (IDSs) and Intrusion Prevention Systems (IPSs). Let $G_v(V_v, E_v)$ be a directed acyclic graph which represents a Service Function Chain (SFC) consisting of a sequence $V_v$ of VNFs and set $E_v$ of virtual links among the VNFs. The cost functions include operational cost, traffic transmission cost and penalty cost.

The operational cost represents the cost $C_m$ of migrating existing VNFs and/or adding new ones since the last service time as well as the cost $C_e$ of energy consumed by the VNFs. Specifically, the operational cost can be quantified using Eq. (1).

$$C_{opr}(t) = C_m(t) + C_e(t), \text{ where} \quad (1)$$

$$C_m(t) = \sum_{n=1}^{|V_v|} \sum_{m,\bar{m}=1}^{|V_h|} \alpha_{n,m}^p(t) \cdot \Gamma_n^{m,\bar{m}}(t) + \alpha_{n,m}^p(t) \cdot \xi_{n,m}(t) \cdot [N_m^{|V_v|}(t) - N_m^{|V_v|}(t-1)],$$

$$\forall p \in P \quad (2)$$

$$C_e(t) = \sum_{n=1}^{|V_v|} \sum_{m,\bar{m}=1}^{|V_h|} \alpha_{n,m}^p(t) \cdot \phi_m(t) \cdot [p_m^{idle}(t) + \tau_{n,m}(t) \cdot [p_m^{max}(t) - p_m^{idle}(t)]],$$

$$\forall p \in P \quad (3)$$

The cost of transmitting traffic volume pertaining to a specific SFC through a physical link in the substrate network is given by Eq. (4).

$$C_{trans}(t) = \sum_{e \in E} \sum_{e_v \in E_v} \beta_{e_v,e}(t) \cdot b\hat{w}_{e_v}(t) \cdot \ddot{\mathrm{U}}_{e_v}, \forall p \in P \quad (4)$$

Penalty cost represents the cost that providers have to pay to customers in case some violation of the SLO agreement clauses occurs (e.g., exceeding the tolerable delay agreed upon between providers and customers).

$$C_{penalty}(t) = \sum_{a=1}^{|V_v|} \sum_{x=1}^{|V_h|} \sum_{b=1}^{|V_v|} \sum_{y=1}^{|V_h|} \alpha_{a,x}^p(t) \cdot \alpha_{b,y}^p(t) \cdot d_{x,y}^{a,b}(t) \cdot \Upsilon_{x,y}^{a,b}(t), \quad (5)$$

$$\forall p \in P$$

Objective Function: The cost function C(t) of the provider at a certain time moment t can be defined as the sum of the operational, traffic transmission, and penalty costs at that moment, i.e., $$C(t) = C_{opr}(t) + C_{trans}(t) + C_{penalty}(t). \quad (6)$$

Thus, the objective of the providers is to minimize $$\sum_{t=t1}^{tn} C(t) \quad (7)$$

The constraints are described below. Constraints (8)-(12) are VNF assignment and readjustment constraints, and constraints (13)-(15) are routing and bandwidth allocation constraints.

$$\sum_{t=t1}^{tn} \sum_{n=1}^{|V_v|} \sum_{m=1}^{|V_h|} \alpha_{n,m}^p(t) \leq \eta_p(t) \cdot y_{m,p}(t), \forall p \in P \quad (8)$$

Constraint (8) ensures that the number of users of each VNF type $p \in P$ at time t does not exceed the type's capacity at that time moment.

$$\sum_{t=t1}^{tn} \sum_{n=1}^{|V_v|} \sum_{m=1}^{|V_h|} \alpha_{n,m}^p(t) \cdot R_m^p(t) \cdot y_{m,p}(t) \leq (1+\mu_m) \cdot R_m^{max}(t), \forall p \in P \quad (9)$$

Constraint (9) guarantees that the amount of hardware resources consumed by the VNFs cannot exceed the physical server's hardware resources capacity.

$$\sum_{t=t1}^{tn} C_e(t) \leq E_{S_i}(t), \forall s_i \in V_h \quad (10)$$

Constraint (10) ensures that the energy cost entailed at each time moment t does not exceed a certain upper limit $E_{si}$ specified by the provider.

$$\sum_{t=t_1}^{t_n} C_{opr}(t) \leq O^{max} \quad (11)$$

Constraint (11) ensures that the operational cost of the provider at each time moment in the discrete time interval $[t_1, t_n]$ does not exceed a certain upper limit $O^{max}$ decided by the provider so as to optimize its own profit.

$$\sum_{t=t1}^{tn} C_{penalty}(t) \leq f_{x,y}^{a,b}(t), \forall a, b \in V_v \text{ and } x, y \in V_h \quad (12)$$

Constraint (12) controls the penalty cost by ensuring that the delay faced by the flow of each pair of VNFs cannot exceed a maximum delay that the flow can tolerate.

$$\sum_{t=t1}^{tn} C_{trans}(t) \leq bw_e(t), \forall e \in E \quad (13)$$

Constraint (13) avoids physical link bandwidth capacity violation by ensuring that the bandwidth consumption of the VNFs on each link of the substrate network does not exceed the link's bandwidth capacity.

$$\sum_{t=t_1}^{t_n} \sum_{e \in E} \sum_{e_v \in E_v} \beta_{e_v,e}(t) = 1 \quad (14)$$

Constraint (14) guarantees that each virtual link $e_v \in E_v$ is mapped to only one single substrate link $e \in E$.

$$\alpha_{v_v, v_h^P}(t) = \Sigma_{s(e) = v_h} q_{v_v, e}(t), \forall v_h \in V_h, \forall v_v \in V_v, \forall p \in P, \text{ and}$$

$$\alpha_{(v_v+1), v_h^P}(t) = \Sigma_{d(e) = v_h} q_{v_v, e}(t), \forall v_h \in V_h, \forall v_v \in V_v, \forall p \in P \quad (15)$$

Constraint (15) guarantees that if path $e \in E$ is chosen to establish the connection between the VNFs $v_v$ and $(v_v+1)$, then those VNFs $v_v$ and $(v_v+1)$ must be deployed on the source $s(e)$ and destination $d(e)$ of path $e$, respectively.

The following description explains the clustering approach to partition the substrate network and provides the details of the placement and readjustment algorithms based on machine learning.

In order to adaptively and efficiently optimize the hardware and network resource consumption in the cloud datacenters while improving users' experience, a machine learning approach is proposed which allows cloud administrators to break down the substrate network into multiple clusters with the aim of reducing the complexity and overhead of the placement and readjustment process. The machine learning approach consists of: (1) multi-criteria k-medoids clustering, which partitions the datacenter's physical servers into a set of on-demand disjoint clusters on the basis of some attributes that network administrators seek to optimize such as CPU, energy, delay, and bandwidth, (2) a statistical technique which improves the selection of the initial set of cluster-heads, thus reducing the clustering time and improving the quality of the final set of clusters, and (3) machine learning-based placement and readjustment algorithms which continuously and adaptively adjust the mapping of new/in-service VNFs to the physical servers in the substrate network with reduced time and overhead.

First, the initial cluster-head selection is described. K-medoids is a partitioning clustering approach that seeks to minimize the sum of dissimilarities between a set of points in a certain cluster and a point designated as the center of that cluster (a.k.a medoid). More formally, given a dataset $D = \{d_1, d_2, \ldots, d_n\}$ with n data objects, K-medoids generates clusters through arbitrarily choosing a set of K data points of D to be the medoids and then assigning each non-selected data point of D to its closest medoid. Thereafter, for each medoid x, a non-medoid data point $x^o$ is randomly selected and the cost of replacing x with $x^o$ is computed. If this cost is less than the cost of keeping the current medoid, the current medoid is replaced with $x^o$; otherwise the clustering topology is kept unchanged. K-medoids is an improvement of K-means which is known to be sensitive to outliers, owing to its reliance on the mean values. To tackle this problem, K-medoids relies instead on the most centrally located objects to derive the clusters, rather than the mean values. However, the K-medoids technique selects the initial set of medoids in an arbitrary fashion, which negatively affects the quality of the generated clusters and increases its time to converge to a stable clustering structure. To address this shortcoming, an intelligent statistical technique is integrated on top of K-medoids to optimize its performance and efficiency.

The basic idea of the statistical technique is to compute the variance, in terms of a certain attribute to be optimized (e.g., energy, bandwidth), between each server and all other servers in the network. Thereafter, the variance of the whole set of servers is computed. Accordingly, the servers whose variance (with respect to the other servers in the network) is less than the whole servers' set variance are pre-selected as being eligible candidates to act as cluster-heads. The intuition behind this process is to exclude the outliers that are far away from the central region, which have high variance values. Having obtained the set of eligible servers, the kept candidates are further filtered. This is achieved through computing the (Euclidean) distance between each pair of servers in terms of some specific attributes, and choosing the server that minimizes the distance with regards to all other servers as the first cluster-head. To guarantee the coherence of the clustering topology and prevent overlapping clusters, the second cluster-head is selected as being the one that maximizes the distance from the first cluster-head. Having two initial cluster-heads at hand, the number of cluster-heads is increased up to κ (the value of κ is specified by the network administrators). This is achieved through a continuous search process (for κ times) for the servers that maximize the distance from the previously selected cluster-heads. The stepwise methodology of this process, along with the mathematical formulae, are explained in what follows.

1. Compute the Euclidean distance $d(s_i, s_j)$ between each pair $(s_i, s_j)$ of servers based on a set of K attributes using Eq. (16):

$$d(si, sj) = \sqrt{\sum_{k=1}^{K} (s_i^k - s_j^k)^2} \quad (16)$$

2. Compute the standard deviation of the whole servers' set, i.e., the standard deviation among all servers and their mean using Eq. (17).

$$\sigma = \sqrt{\frac{1}{n-1} \sum_{i=1}^{n} d(s_i, \bar{s})^2} \quad (17)$$

-continued $$\bar{s} = \sum_{i=1}^{n} \frac{s_i}{n} \quad (18)$$

3. Compute the standard deviation between each server $s_i$ and all other servers using Eq. (19):

$$\sigma_i = \sqrt{\frac{1}{n-1} \sum_{j=1}^{n} d(s_i, s_j)^2} \quad (19)$$

4. Determine the set P of all possible cluster-head candidates as the ones having a standard deviation that is less than or equal to the standard deviation of the whole set of servers, proportionally to a stretch factor ω as depicted in Eq. (20).

$$P = \{s_i | \sigma_i \leq \omega \bar{\sigma}, i=1, \ldots, n\} \quad (20)$$

5. Compute the distance $d_i$ of each server $s_i$ (from all other servers) using Eq. (21):

$$d_i = \sum_{j=1}^{n} d(s_i, s_j) \quad (21)$$

6. Select the first cluster-head $p_1$ as the one that minimizes the distance (computed in Eq. (21)) with all other servers using Eq. (22).

$$p_1 = \arg\min_{s_i \in P} \{d_i | i=1, \ldots, n\} \quad (22)$$

7. Select the second cluster-head $p_2$ in such a way to maximize the distance with the previously selected cluster-head $p_1$ as depicted in Eq. (23):

$$p_2 = \arg\max_{s_i \in P} \{d(s_i, p_1) | i=1, \ldots, n\} \quad (23)$$

8. Select κ new cluster-heads within each cluster as the ones that are the farthest from their current medoid ($p_1$ or $p_2$) using Eq. (24):

$$p'_j = \arg\max_{s_i \in c_j \in P} \{d(s_i, p_i) | i=1, \ldots, n\} \quad (24)$$

Having selected the initial set of κ cluster-heads, the next step is to optimize the selection process for improved clustering performance and quality. An embodiment of the clustering algorithm (Algorithm 1) is shown in FIG. 4.

In Algorithm 1, steps (7) to (13) implement the aforementioned statistical technique to determine the set of initial cluster-heads. Having the initial cluster-heads at hand, the following steps are repeated until no change in the identity of the cluster-heads occurs. Each server is assigned to the closest (initial) cluster-head (in terms of the considered attributes) (Step 15). Then, in step 16 the clustering cost $D_1$ (i.e., the sum of distances from each cluster-head to its cluster members) is computed as per Eq. (25).

$$\sum_{k=1}^{K} \sum_{z \in C_k} d(p_k, z)^2 \quad (25)$$

Thereafter, for each cluster, the server which minimizes the total distance from the other servers in its cluster is selected as a replacement cluster-head (Steps 17-18). Consequently, each server is assigned again to the closest newly appointed cluster-head (Step 19) and the new clustering cost $D_2$ in the presence of the new cluster-head is recomputed as per Eq. (25). If the new clustering cost $D_2$ is equal to the primary clustering cost $D_1$ (Step 21), then the algorithm stops and the clustering topology remains unchanged. Otherwise, Steps 15-21 are repeated until reaching a stable clustering topology.

The proposed clustering approach generates a set of clusters which can be of one or more dimensions based on the number K of attributes in question. For example, there can be an energy efficient cluster (i.e., K=1), an energy-bandwidth efficient cluster (i.e., K=2), an energy-bandwidth-delay efficient cluster (i.e., K=3), and so on.

Having formed the clusters and selected the cluster-heads, the next step is to perform the actual VNF placement and readjustment processes while ensuring minimal resource wastage for providers and improved QoS for users. To ease these processes, the proposed machine learning technique serves as a preprocessing step for both the placement algorithm (Algorithm 2 in FIG. 5) and readjustment algorithm (Algorithm 3 in FIG. 6) to reduce the complexity of solving the ILP in Equation (7). The reduction in complexity is achieved by two strategies. The first strategy is to decentralize the placement and readjustment processes and distributing these duties among the different cluster-heads formed as per Algorithm 1, thus reducing the search space (i.e., number of servers and links) of the problem. Instead of having one central entity charged with placing and readjusting all VNFs on all servers and links, each cluster-head carries out these duties for only a subset of the physical network. The second strategy is to reduce the number of parameters to be minimized per cluster, according to the metrics in which the underlying cluster is efficient. Specifically, instead of solving the problem for all parameters (i.e., energy, bandwidth, CPU, and delay) which is NP-hard, the disclosed method enables each cluster-head to solve the problem for only a subset of parameters. This is done by excluding the parameters that each cluster is efficient in (determined through the machine learning technique) from the problem. For example, a bandwidth-delay efficient cluster-head may solve the problem to minimize the energy and CPU only (i.e., one cost function given in Eq. (1)). The intuition behind this is that a cluster that is already efficient in terms of bandwidth and delay at a certain time moment would give priority to minimizing other metrics (at that moment).

Referring to FIG. 5, Algorithm 2 is introduced to illustrate the cluster-based placement process. For each new incoming SFC, the underlying cluster-head solves the ILP for a subset of metrics (other than those that the cluster is efficient in) in order to determine the VNF-to-Server mappings (Algorithm 2—Step 9). Based on the results obtained by solving the ILP, the VNFs composing the SFC in question are placed on the servers selected by the feasible solution (Algorithm 2—Steps 10-16), and the virtual links among the VNFs are mapped as well to the corresponding physical links (Algorithm 2—steps 17-23). The main complexity of Algorithm 2 lies in solving the ILP. As explained in the previous paragraph, machine learning is leveraged to alleviate this complexity by eliminating cost functions and keeping only one cost function at a time. More than one cost function may be kept in an alternative example. Thus, according to the type of the kept cost function, the problem is turned into finding the set of servers and links that minimize energy, bandwidth, CPU, or delay.

Referring to FIG. 6, Algorithm 3 is introduced to illustrate the cluster-based readjustment process. Specifically, each cluster-head continuously checks whether constraints (8)-(15) are about to be violated or not. If no violation is anticipated, the status quo of the datacenter in terms of VNF and virtual link mappings remains unchanged (Algorithm 3—Step 11). Otherwise, Algorithm 4 (FIG. 7) is run to locate the migration destination of the VNFs that are determined to be the cause of the potential violation(s) depending on the violation type (Algorithm 3—Step 13). Specifically, Algorithm 4 performs an extensive check to determine which constraint(s) are potential subjects to violation and accordingly specify the destination cluster of those suspicious VNFs. For example, if the bandwidth and energy constraints (Constraints (13) and (10)) are the ones that are anticipated to be violated, then the bandwidth-energy efficient cluster is selected to be the migration destination cluster. This example considers only two-dimensional clusters in Algorithm 4; however, the Algorithm can be easily customized by adding/removing dimensions (i.e., cluster types) based on the needs of the underlying situation. Based on the output of Algorithm 4, the selected cluster-head(s) solve the aforementioned ILP for a subset of metrics (other than those that the cluster is efficient in) at the level of their clusters to determine the corresponding VNF-to-Server mappings (Algorithm 3—Step 15). Based on the results obtained by the solution of the ILP, the VNFs (previously identified as being the cause of the potential violation) are placed on the corresponding servers in the appropriate cluster (Algorithm 3—Steps 17-24) and the virtual links among the VNFs are mapped as well to the corresponding physical links (Algorithm 3—Steps 25-32). Note that this whole process is periodically repeated after a certain period of time ε as long as constraint (11) is satisfied (i.e., as long as the operational overhead which is greatly influenced by the readjustment cost does not exceed the upper limit specified by the provider). The periodic repetition is helpful in terms of capturing the changes that might occur either at the level of the datacenter or at the level of the users such as arrival of new SFCs, leave of some users, and change in the users' location.

Figure 8:
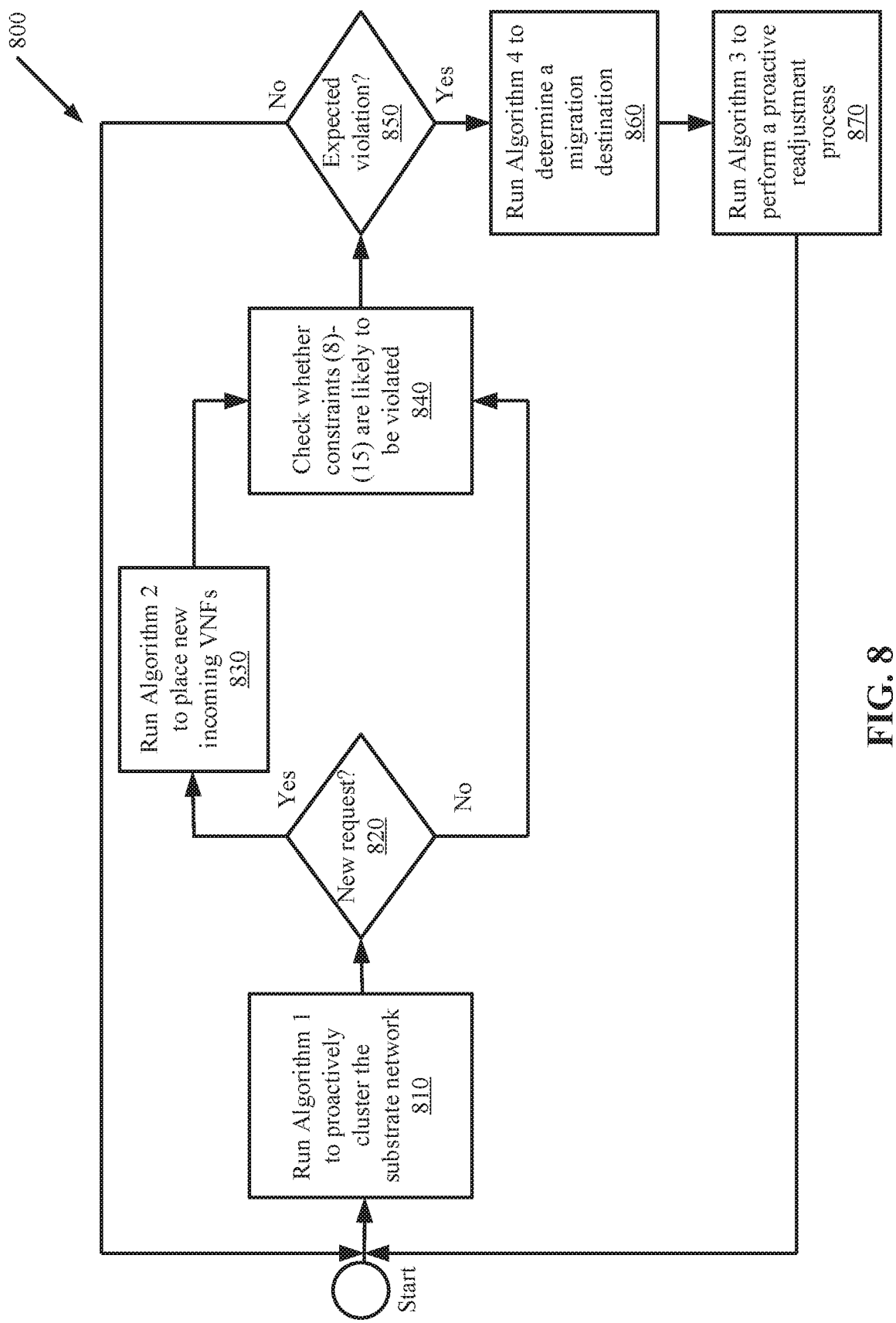
FIG. 8 is a block diagram illustrating a process of VNF placement and readjustment using the aforementioned algorithms according to one embodiment.

FIG. 8 is a block diagram illustrating a process 800 of VNF placement and readjustment using the aforementioned algorithms according to one embodiment. The process 800 starts by running Algorithm 1 to proactively cluster the substrate network at step 810. If there is a new SFC request at step 820, Algorithm 2 is run at step 830 to place new incoming VNFs in the substrate network. If there is no new SFC request, or the execution of Algorithm 2 at step 830 is completed, constraints (8)-(15) are checked at step 840 to determine whether any of these constraints are likely to be violated. If there is no expected violation at step 850, the process 800 returns to step 810 to execute Algorithm 1. If there is expected violation at step 850, the process 800 proceeds to step 860 to run Algorithm 4 to determine a migration destination. Thereafter, Algorithm 3 is run at step 870 to perform a proactive readjustment process.

Figure 9:
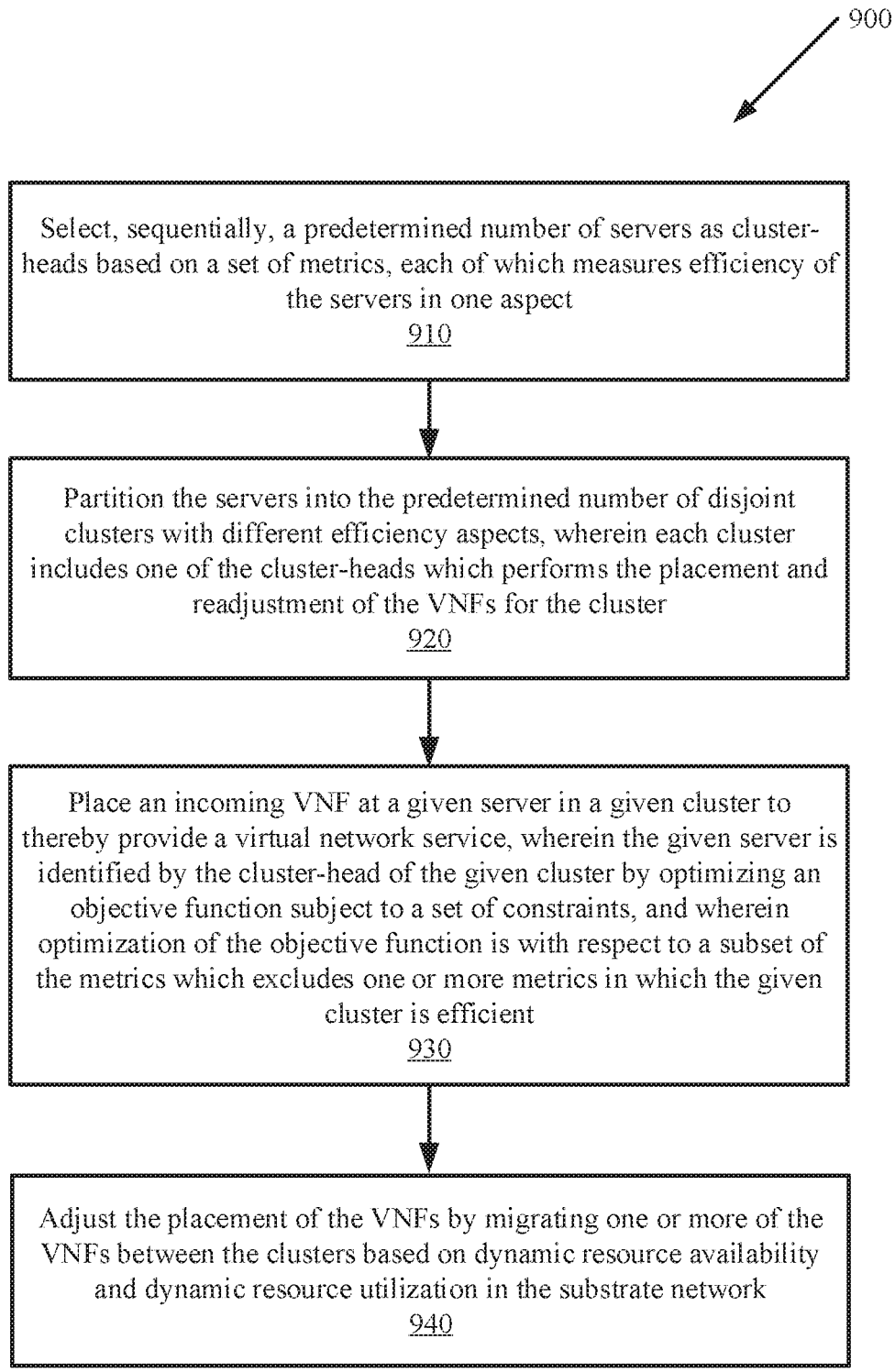
FIG. 9 is a flow diagram illustrating a method for joint placement and chaining of VNFs according to one embodiment.

FIG. 9 is a flow diagram illustrating a method 900 for placement and readjustment of VNFs in a substrate network including a plurality of servers according to one embodiment. The method 900 starts at step 910 with a network node sequentially selecting a predetermined number of servers as cluster-heads based on a set of metrics. Each of the metrics measures the efficiency of the servers in one aspect. At step 920, the network node partitions the servers into the predetermined number of disjoint clusters with different efficiency aspects. Each cluster includes one of the cluster-heads which performs the placement and readjustment of the VNFs for the cluster. At step 930, a cluster-head of a given cluster places an incoming VNF at a given server in the given cluster to thereby provide a virtual network service. The given server is identified by the cluster-head of the given cluster by optimizing an objective function subject to a set of constraints. The objective function is optimized with respect to a subset of the metrics which excludes one or more metrics in which the given cluster is efficient. At step 940, the placement of the VNFs is adjusted by migrating one or more of the VNFs between the clusters based on dynamic resource availability and dynamic resource utilization in the substrate network.

In one embodiment, a set of cluster-head candidates are selected based on a statistical measure of the difference between each server and all other servers in the substrate network. The predetermined number of servers are then selected from the set of cluster-head candidates. A first cluster-head may be selected from the set of cluster-head candidates which minimizes a distance to all of the other servers, where the distance is measured by the set of metrics. A subsequent cluster-head may be selected from the set of cluster-head candidates to maximize a distance to previously selected cluster-heads, where the distance is also measured by the set of metrics.

In one embodiment, when selecting the set of cluster-head candidates, the network node computes, for each server, a first variance between the server and all other servers in the substrate network. The network node further computes a second variance of all of the servers in the substrate network. For each server, the network node compares the first variance with the second variance to determine whether the server is to be selected as one as the cluster-head candidate.

In one embodiment, when adjusting the placement of the VNFs, each cluster-head determines whether a potential violation of one or more constraints is to occur in the cluster to which the cluster-head belongs. A cluster is selected to be a migration destination cluster for a VNF causing the potential violation, where the migration destination cluster is efficient in satisfying the one or more constraints. The VNF causing the potential violation is placed at a destination server in the migration destination cluster. The destination server is identified by the cluster-head of the migration destination cluster by optimizing the objective function subject to the set of constraints with respect to another subset of metrics which excludes one or more other metrics in which the migration destination cluster is efficient.

In one embodiment, the clusters include at least a first cluster efficient with respect to at least a first metric and a second cluster efficient with respect to at least a second metric different from the first metric. A cluster-head in a cluster may be replaced with a new cluster-head selected within the cluster. The new cluster-head minimizes a total distance to other servers in the cluster.

In one embodiment, the objective function is optimized subject to the set of constraints using Integer Linear Programming. In one embodiment, the objective function includes an operational cost function, a transmission cost function, and a penalty cost function which represents a cost for a service provider when a Service-Level Objective (SLO) is violated. In one embodiment, the set of constraints includes at least resource constraints on the servers and substrate links in the substrate network, and a constraint on a penalty cost caused by an over-the-limit traffic flow delay between a VNF pair.

Figure 10:
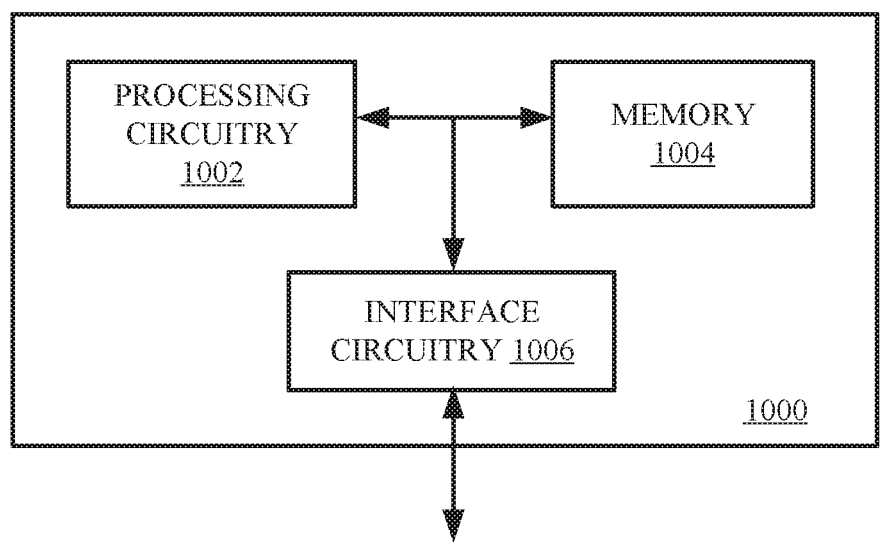
FIG. 10 is a block diagram of a network node according to one embodiment.

FIG. 10 is a block diagram illustrating a network node 1000 according to an embodiment. In one embodiment, the network node 1000 may be a server in an operator network or in a datacenter. The network node 1000 includes circuitry which further includes processing circuitry 1002, a memory 1004 or instruction repository and interface circuitry 1006.

The interface circuitry 1006 can include at least one input port and at least one output port. The memory 1004 contains instructions executable by the processing circuitry 1002 whereby the network node 1000 is operable to perform or cause to perform the various embodiments described herein, including the method 1000 of FIG. 10.

Figure 11:
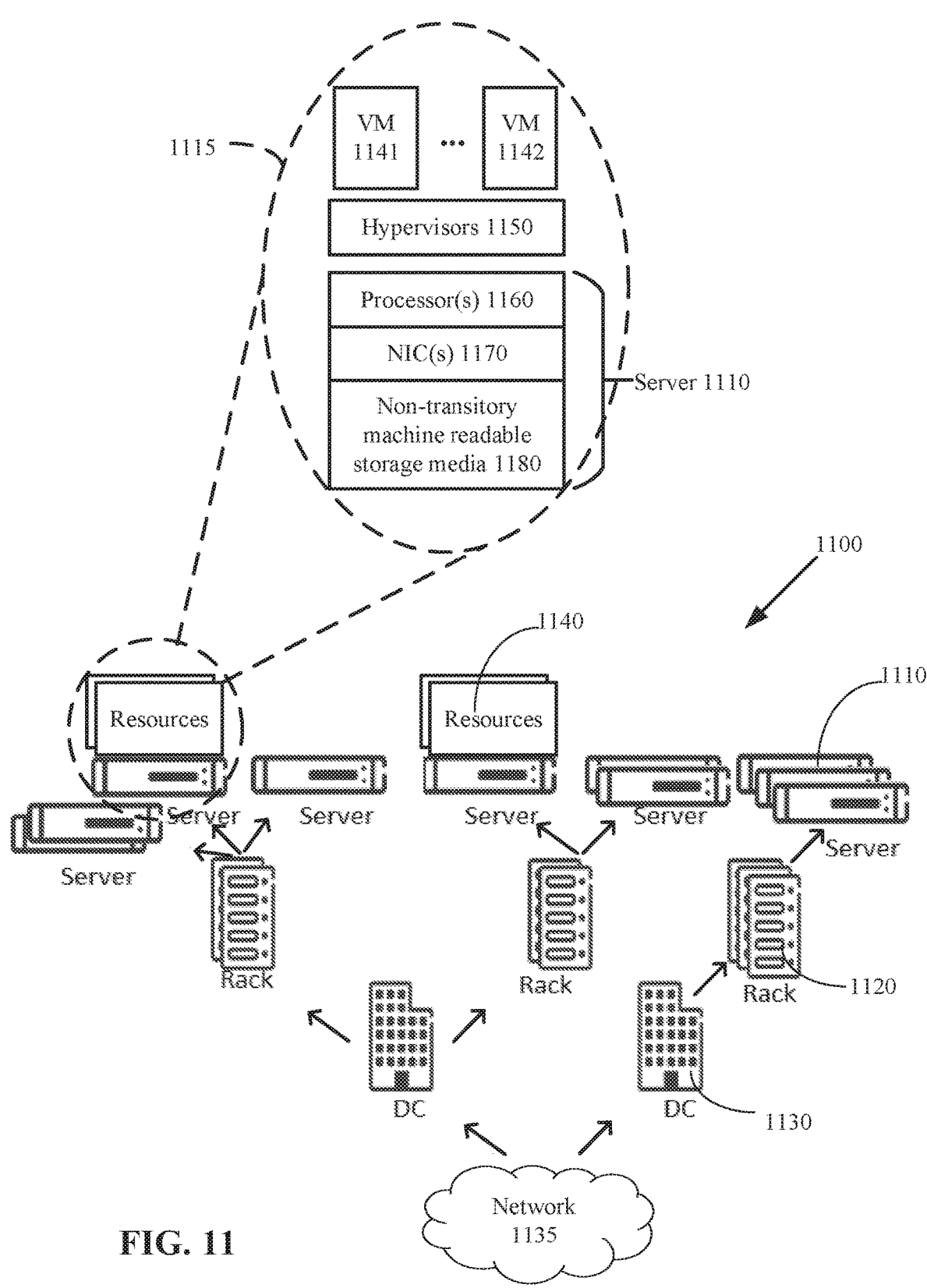
FIG. 11 is an architectural overview of a cloud computing environment according to one embodiment.

FIG. 11 is an architectural overview of a cloud computing environment 1100 that comprises a hierarchy of cloud computing entities. The cloud computing environment 1100 can include a number of different datacenters (DCs) 1130 at different geographic sites connected over a network 1135. Each datacenter 1130 site comprises a number of racks 1120, each rack 1120 comprises a number of servers 1110. It is understood that in alternative embodiments a cloud computing environment may include any number of datacenters, racks and servers. A set of the servers 1110 may be selected to host resources 1140. In one embodiment, the servers 1110 provide an execution environment for hosting entities and their hosted entities, where the hosting entities may be service providers and the hosted entities may be the services provided by the service providers. Examples of hosting entities include virtual machines (which may host containers) and containers (which may host contained components), among others. A container is a software component that can contain other components within itself. Multiple containers can share the same operating system (OS) instance, and each container provides an isolated execution environment for its contained component. As opposed to VMs, containers and their contained components share the same host OS instance and therefore create less overhead. Each of the servers 1110, the VMs, and the containers within the VMs may be configured to perform the various embodiments as have been described herein.

Further details of the server 1110 and its resources 1140 are shown within a dotted circle 1115 of FIG. 11, according to one embodiment. The cloud computing environment 1100 comprises a general-purpose network device (e.g. server 1110), which includes hardware comprising a set of one or more processor(s) 1160, which can be commercial off-the-shelf (COTS) processors, dedicated Application-Specific Integrated Circuits (ASICs), or any other type of processing circuit including digital or analog hardware components or special-purpose processors, and network interface controller(s) 1170 (NICs), also known as network interface cards, as well as non-transitory machine-readable storage media 1180 having stored therein software and/or instructions executable by the processor(s) 1160.

During operation, the processor(s) 1160 execute the software to instantiate a hypervisor 1150 and one or more VMs 1141, 1142 that are run by the hypervisor 1150. The hypervisor 1150 and VMs 1141, 1142 are virtual resources, which may run node instances in this embodiment. In one embodiment, the node instance may be implemented on one or more of the VMs 1141, 1142 that run on the hypervisor 1150 to perform the various embodiments as have been described herein. In one embodiment, the node instance may be instantiated as a network node performing the various embodiments as described herein.

Embodiments may be represented as a software product stored in a machine-readable medium (such as the non-transitory machine-readable storage media 1190, also referred to as a computer-readable medium, a processor-readable medium, or a computer-usable medium having a computer-readable program code embodied therein). The non-transitory machine-readable medium 1190 may be any suitable tangible medium including a magnetic, optical, or electrical storage medium including a diskette, compact disk read-only memory (CD-ROM), digital versatile disc read-only memory (DVD-ROM) memory device (volatile or non-volatile) such as hard drive or solid-state drive, or similar storage mechanism. The machine-readable medium may contain various sets of instructions, code sequences, configuration information, or other data, which, when executed, cause a processor to perform steps in a method according to an embodiment. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art.

What is claimed is:

1. A method for placement and readjustment of Virtual Network Functions (VNFs) in a substrate network including a plurality of servers, comprising:

selecting, sequentially, a predetermined number of servers as cluster-heads based on a set of metrics, each of which measures efficiency of the servers in one aspect;

partitioning the servers into the predetermined number of disjoint clusters with different efficiency aspects, wherein each cluster includes one of the cluster-heads which performs the placement and readjustment of the VNFs for the cluster;

placing an incoming VNF at a given server in a given cluster to thereby provide a virtual network service, wherein the given server is identified by the cluster-head of the given cluster by optimizing an objective function subject to a set of constraints, and wherein optimization of the objective function is with respect to a subset of the metrics which excludes one or more metrics in which the given cluster is efficient; and adjusting the placement of the VNFs by migrating one or more of the VNFs between the clusters based on dynamic resource availability and dynamic resource utilization in the substrate network.

2. The method of claim 1, wherein selecting the predetermined number of servers further comprises:

selecting a set of cluster-head candidates based on a statistical measure of difference between each server and all other servers in the substrate network; and selecting the predetermined number of servers from the set of cluster-head candidates.

3. The method of claim 2, further comprising:

selecting a first cluster-head from the set of cluster-head candidates which minimizes a distance to all of other servers, wherein the distance is measured by the set of metrics.

4. The method of claim 2, further comprising:

selecting a subsequent cluster-head from the set of cluster-head candidates to maximize a distance to previously selected cluster-heads, wherein the distance is measured by the set of metrics.

5. The method of claim 2, wherein selecting the set of cluster-head candidates further comprises:

computing, for each server, a first variance between the server and all other servers in the substrate network;

computing a second variance of all of the servers in the substrate network; and comparing, for each server, the first variance with the second variance to determine whether the server is to be selected as one as the cluster-head candidate.

6. The method of claim 1, wherein adjusting the placement of the VNFs further comprises:
  determining, by each cluster-head, whether a potential violation of one or more constraints is to occur in the cluster to which the cluster-head belongs; and
  selecting a cluster to be a migration destination cluster for a VNF causing the potential violation, wherein the migration destination cluster is efficient in satisfying the one or more constraints.

7. The method of claim 6, wherein migrating the VNF further comprises:
  placing the VNF at a destination server in the migration destination cluster, wherein the destination server is identified by the cluster-head of the migration destination cluster by optimizing the objective function subject to the set of constraints with respect to another subset of the metrics which excludes one or more other metrics in which the migration destination cluster is efficient.

8. The method of claim 1, wherein the clusters include at least a first cluster efficient with respect to at least a first metric and a second cluster efficient with respect to at least a second metric different from the first metric.

9. The method of claim 1, further comprising:
  replacing a cluster-head in a cluster with a new cluster-head selected within the cluster, wherein the new cluster-head minimizes a total distance to other servers in the cluster.

10. The method of claim 1, wherein identifying a server in the given cluster for the placement of an incoming VNF further comprises:
  optimizing the objective function subject to the set of constraints using Integer Linear Programming.

11. The method of claim 1, wherein the objective function includes an operational cost function, a transmission cost function, and a penalty cost function which represents a cost for a service provider when a Service-Level Objective (SLO) is violated.

12. The method of claim 1, wherein the set of constraints includes at least resource constraints on the servers and substrate links in the substrate network, and a constraint on a penalty cost caused by an over-the-limit traffic flow delay between a VNF pair.

13. A network node, comprising:
  processing circuitry; and
  memory, which stores instructions executable by the processing circuitry to place and readjust placement of Virtual Network Functions (VNFs) in a substrate network including a plurality of servers, the network node operative to perform or cause to perform operations of:
    selecting, sequentially, a predetermined number of servers as cluster-heads based on a set of metrics, each of which measures efficiency of the servers in one aspect;
    partitioning the servers into the predetermined number of disjoint clusters with different efficiency aspects, wherein each cluster includes one of the cluster-heads which performs the placement and readjustment of the VNFs for the cluster;
    placing an incoming VNF at a given server in a given cluster to thereby provide a virtual network service, wherein the given server is identified by the cluster-head of the given cluster by optimizing an objective function subject to a set of constraints, and wherein optimization of the objective function is with respect to a subset of the metrics which excludes one or more metrics in which the given cluster is efficient; and
    adjusting the placement of the VNFs by migrating one or more of the VNFs between the clusters based on dynamic resource availability and dynamic resource utilization in the substrate network.

14. The network node of claim 13, wherein, when selecting the predetermined number of servers, the network node is further operative to:
  select a set of cluster-head candidates based on a statistical measure of difference between each server and all other servers in the substrate network; and
  select the predetermined number of servers from the set of cluster-head candidates.

15. The network node of claim 14, wherein the network node is further operative to:
  select a first cluster-head from the set of cluster-head candidates which minimizes a distance to all of other servers, wherein the distance is measured by the set of metrics.

16. The network node of claim 14, wherein the network node is further operative to:
  select a subsequent cluster-head from the set of cluster-head candidates to maximize a distance to previously selected cluster-heads, wherein the distance is measured by the set of metrics.

17. The network node of claim 14, wherein, when selecting the set of cluster-head candidates, the network node is further operative to:
  compute, for each server, a first variance between the server and all other servers in the substrate network;
  compute a second variance of all of the servers in the substrate network; and
  compare, for each server, the first variance with the second variance to determine whether the server is to be selected as one as the cluster-head candidate.

18. The network node of claim 13, wherein, when adjusting the placement of the VNFs, the network node is further operative to:
  cause each cluster-head to determine whether a potential violation of one or more constraints is to occur in the cluster to which the cluster-head belongs; and
  select a cluster to be a migration destination cluster for a VNF causing the potential violation, wherein the migration destination cluster is efficient in satisfying the one or more constraints.

19. The network node of claim 18, wherein the network node is further operative to:
  cause the cluster-head of the migration destination cluster to place the VNF at a destination server in the migration destination cluster, wherein the destination server is identified by the cluster-head of the migration destination cluster by optimizing the objective function subject to the set of constraints with respect to another subset of the metrics which excludes one or more other metrics in which the migration destination cluster is efficient.

20. The network node of claim 13, wherein the clusters include at least a first cluster efficient with respect to at least a first metric and a second cluster efficient with respect to at least a second metric different from the first metric.

21. The network node of claim 13, wherein the network node is further operative to:
  replace a cluster-head in a cluster with a new cluster-head selected within the cluster, wherein the new cluster-head minimizes a total distance to other servers in the cluster.

22. The network node of claim 13, wherein the objective function includes an operational cost function, a transmission cost function, and a penalty cost function which represents a cost for a service provider when a Service-Level Objective (SLO) is violated.

23. The network node of claim 13, wherein the set of constraints includes at least resource constraints on the servers and substrate links in the substrate network, and a constraint on a penalty cost caused by an over-the-limit traffic flow delay between a VNF pair.

* * * * *